Figure 1:
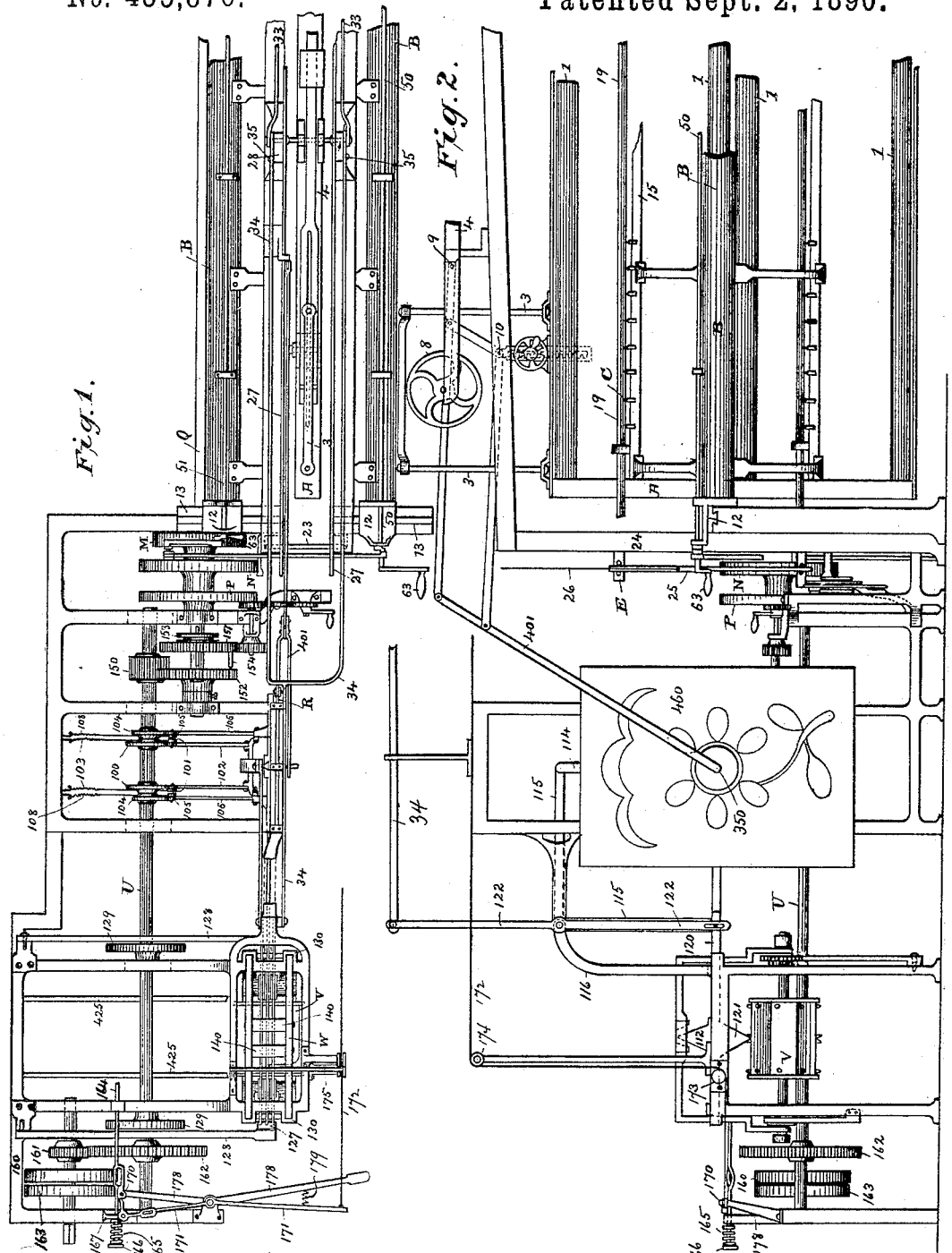

(No Model.) 12 Sheets—Sheet 1.

C. H. WILLCOX & R. WEISS.
EMBROIDERING MACHINE.

No. 435,876. Patented Sept. 2, 1890.

Witnesses
Inventors.
Charles H. Willcox and
Rudolph Weiss by
A. Pollok their attorney.

(No Model.) 12 Sheets—Sheet 8.
C. H. WILLCOX & R. WEISS.
EMBROIDERING MACHINE.
No. 435,876. Patented Sept. 2, 1890.

Witnesses

Inventors.
Charles H. Willcox and
Rudolph Weiss by
A. Pollok
their attorney

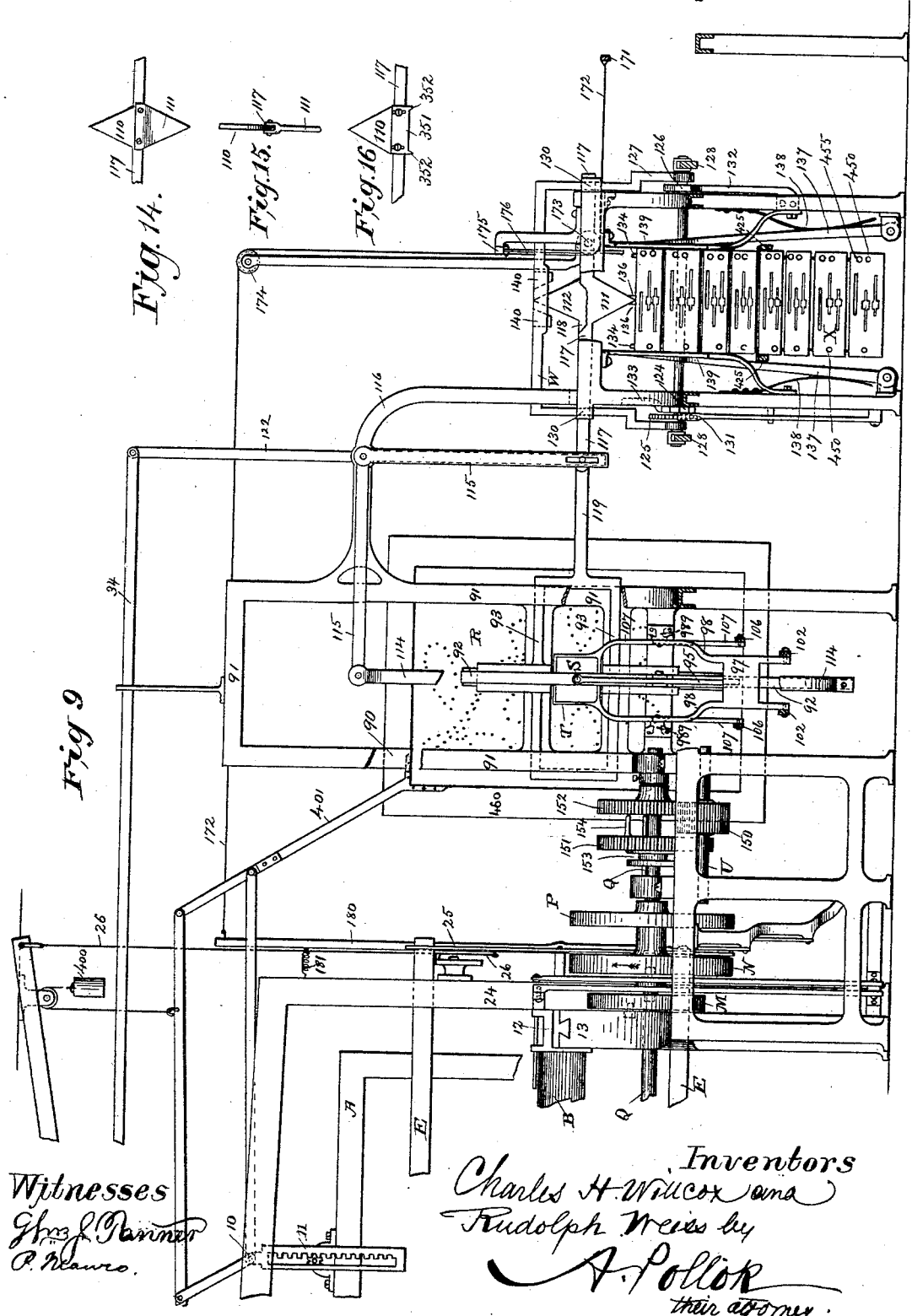

(No Model.)  12 Sheets—Sheet 10.
C. H. WILLCOX & R. WEISS.
EMBROIDERING MACHINE.
No. 435,876. Patented Sept. 2, 1890.
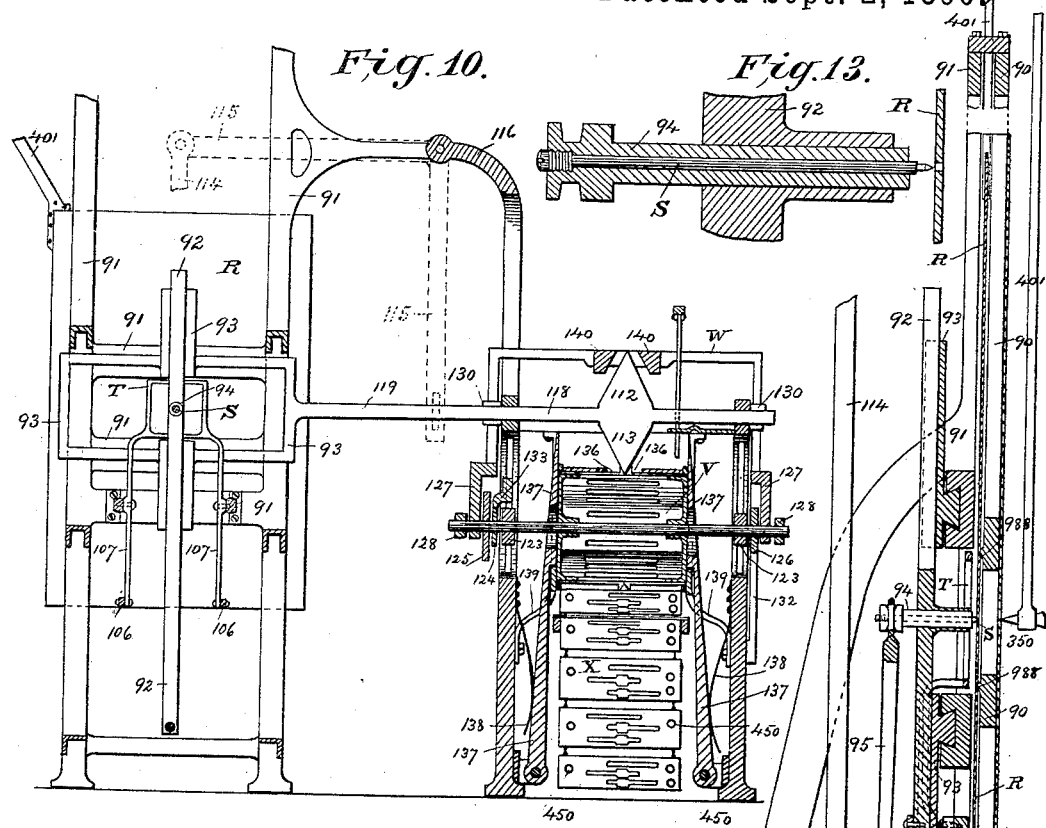
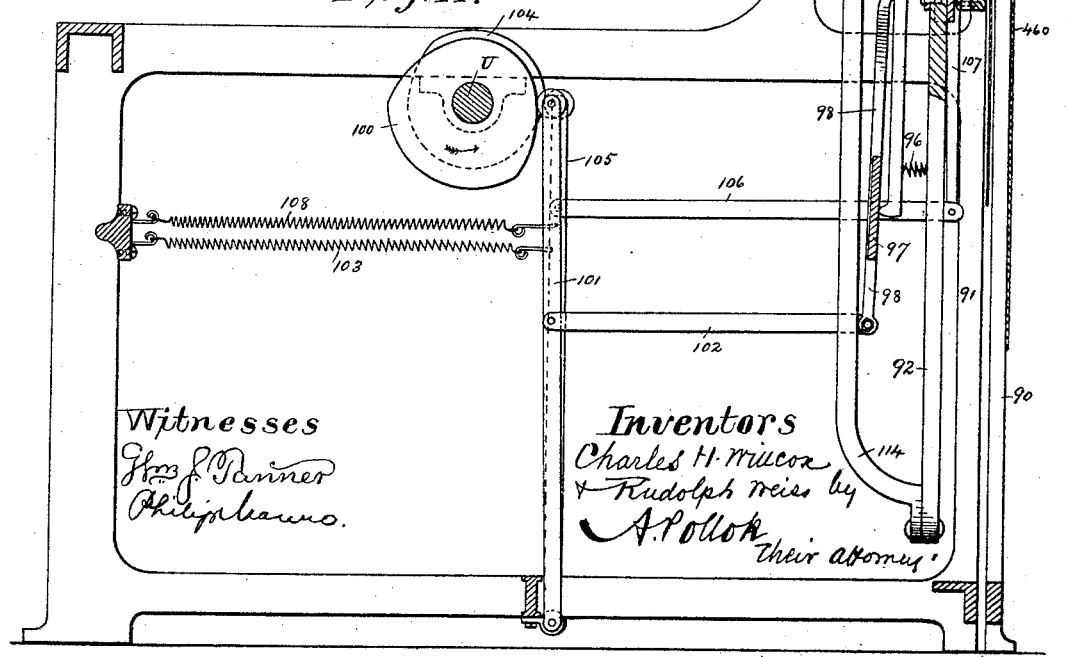
Witnesses
Thos. J. Tanner
Philip Mauro
Inventors
Charles H. Willcox
& Rudolph Weiss by
A. Pollok
their attorney (No Model.)  12 Sheets—Sheet 11.
C. H. WILLCOX & R. WEISS.
EMBROIDERING MACHINE.
No. 435,876. Patented Sept. 2, 1890.
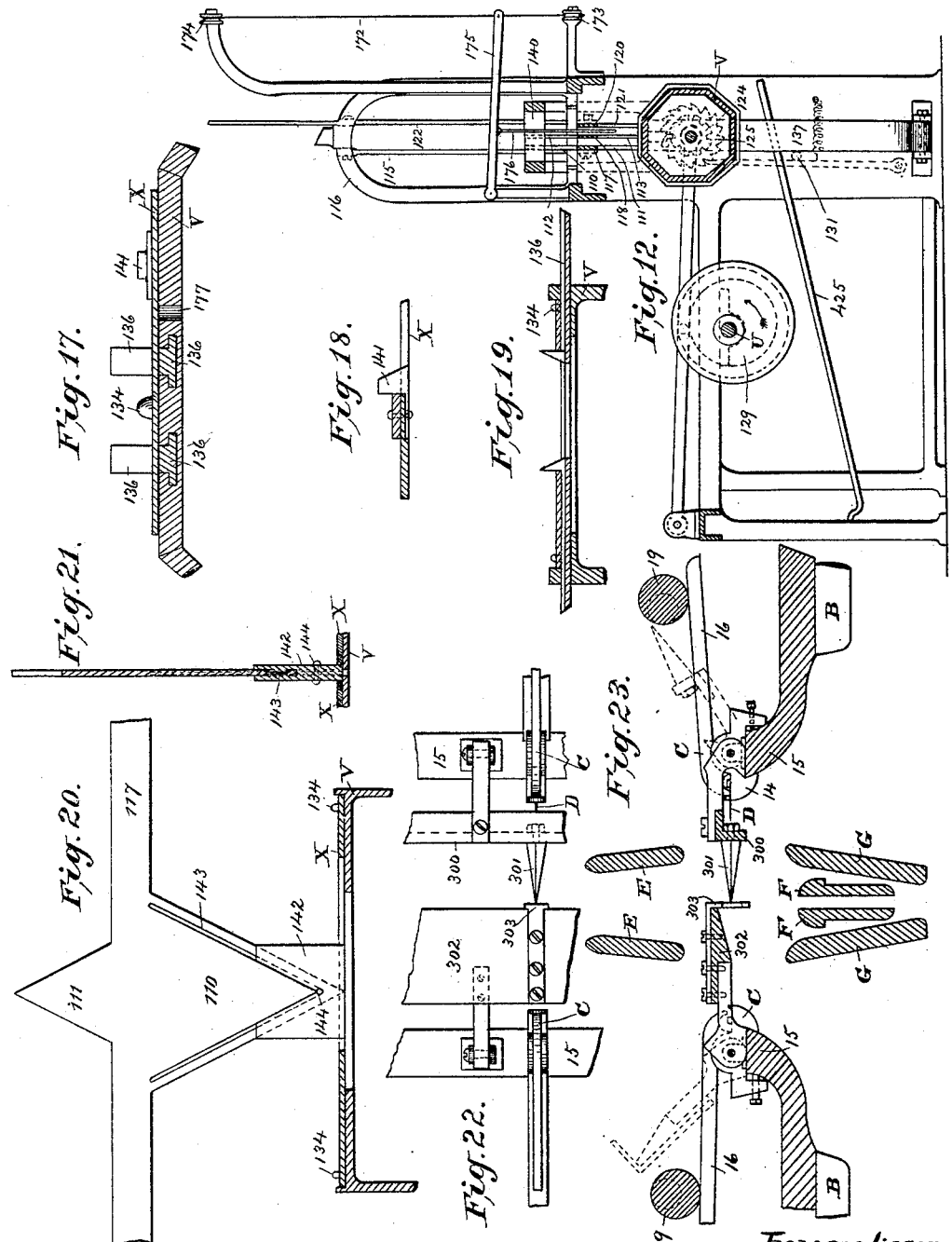
Witnesses
Inventors.
Charles H. Willcox
and Rudolph Weiss, by
A. Pollok
their attorney (No Model.) 12 Sheets—Sheet 12.

C. H. WILLCOX & R. WEISS.
EMBROIDERING MACHINE.

No. 435,876. Patented Sept. 2, 1890.

Witnesses

Inventors
Charles H. Willcox
and Rudolph Weiss
by A. Pollok
their Attorney

United States Patent Office.

CHARLES H. WILLCOX, OF NEW YORK, N. Y., AND RUDOLPH WEISS, OF NOTTINGHAM, ENGLAND, ASSIGNORS TO THE WILLCOX & GIBBS SEWING MACHINE COMPANY, OF NEW YORK, N. Y.

EMBROIDERING-MACHINE.

SPECIFICATION forming part of Letters Patent No. 435,876, dated September 2, 1890.

Application filed December 29, 1884. Renewed July 19, 1889. Serial No. 318,044. (No model.)

*To all whom it may concern:*

Be it known that we, CHARLES H. WILLCOX, of New York city, in the county and State of New York, and RUDOLPH WEISS, of Nottingham, England, have invented new and useful Improvements in Embroidering-Machines, which improvements are fully set forth in the following specification.

This invention, although in part applicable to other machinery, relates more particularly to that class of embroidering-machines which use a series of needles with the eye in the middle of their length and employ in connection with such needles two sets of needle holders or nippers, one set on each side of the fabric for passing the needles simultaneously back and forth through the fabric. Each needle has its individual thread, and the fabric stretched on a frame is moved right and left and up and down before the needles, so that the latter successively enter the fabric at points required by the pattern. Each needle works its own figure, which is of course duplicated by every other needle.

Heretofore this class of machines has in practice, so far as we are aware, been operated by hand, although attempts have been made to produce automatic machines that can be driven by power. The operations which make difficult the production of a successful automatic machine are, first, that at each stitch the thread becomes shorter, so that as ordinarily operated the carriages which carry the nippers must have a constantly-diminishing movement as the threads are used up; second, that the carriage movement diminishes irregularly because some stitches use more thread than others, and, third, that the thread should in some stitches be drawn tighter than in others. The last feature, though of great practical importance, is not so essential as the two former ones, for the reason that a pattern could be embroidered with the same tension on each stitch.

In the present invention one or more thread-holders are provided on each side of the cloth-frame on which the fabric to be embroidered is stretched, and take-ups act upon the threads between the appropriate thread-holder and the carriages, which latter are given a short uniform traverse by a cam and connections or equivalent mechanism. The thread-holders support the thread when drawn upon by the take-ups, thus relieving the fabric of side strains. Each take-up is variable in its action, so that it takes up the slack whatever its length may be. To this end the take-up is actuated in drawing in the slack by a weight or its equivalent and not positively. When, therefore, the threads are tightened they simply prevent further movement of the take-up until it is moved back by mechanism for the purpose. Preferably for the take-ups bars are employed which extend the full width of the machine, so that when allowed to descend they draw down all the threads together equally. The full weight of the bars would ordinarily be more than is required to give the proper tension, and therefore more or less of the weight is counterbalanced. The counter-balance is or may be altered from time to time in order to give the proper tension upon the thread at each stitch. Automatic mechanism is provided for the purpose.

Besides the improvement in the means and mode of operation in drawing in the slack and in tightening the stitches the invention consists in a new combination of devices for shifting the cloth-frame in front of the needles. For this purpose a jacquard or apparatus in the nature of a jacquard is combined with the cloth-frame, which is suspended and counterbalanced in any ordinary or suitable way, and also with a pantograph or system of jointed levers, which is connected with the top of the frame and operates to reduce the movement at the jacquard.

Heretofore it has been proposed to shift the cloth-frame by a jacquard; but, besides the defects in the jacquard itself and the manner of operating it, the connection was made by an arm projecting from the side of the cloth-frame, and the movement at the jacquard was substantially that of the cloth-frame. By the present improvement a comparatively large movement may be made at the jacquard, and this being reduced incidental or accidental variations are lessened in the transmission. Moreover, the cloth-frame being acted upon from the top, gravity tends to make all parts follow the movement of the connection, which is not the case when the connection is a bar projecting from the side.

The invention also comprises a new arrangement of mechanism for shifting the cloth-frame, whereby the shifter-pin or device through which the movement is communicated is always returned to a central position, from which it is moved in the required direction. The object of this is twofold—first, to confine the movement of the shifter-pin within a limited area, since the extreme movement would correspond with the length of a single stitch and not of the whole figure; and, second, to correct small inaccuracies in the Jacquard apparatus. With such apparatus it is impossible to secure always the precise motion desired, although it is practicable to make the variations very small—so small, in fact, that any one of them would be inappreciable. If, however, the movements are made successively the small variations (should they happen, as they often would, to be in the same direction) are added together and the error soon becomes manifest. By returning the shifter-pin to a common point or center the movements are rendered independent of one another. Means are used—such as a cone fitting into a circular hole—to correct after each movement any variation that may have resulted from the small imperfections of the Jacquard apparatus. In order to insure a perfect registry at each movement, a pattern-plate is provided in which there are a series of holes arranged in accordance with the pattern. This plate is fastened to the pantograph-arm. The shifter-pin enters a hole in the plate and moves the plate in such a way that another hole is brought into position to receive the shifter-pin for the next movement. This positive connection is very important to the practical working of the machine, since any slip between the device fastened to the pantograph-arm and the device which is operated by the jacquard and moves said arm would be very likely to disarrange the subsequent operations. The reduction of the motion of the shifter-pin by the pantograph is advantageous in this connection in enabling the holes to be separated by sufficient material even in the smallest stitches.

The invention further consists in the combination, with the embroidering-machine proper or with certain parts thereof, of a new Jacquard apparatus. Apparatus of this nature have heretofore, so far as we are aware, been adapted to impart definite movements only—that is to say, the movements are all the same length, or are multiples of that length, and it is impossible by a mere alteration in the cards to procure whatever length may be desired. The utmost that can be attained is to make the unit of movement very small and thus approximate the desired length. This, however, involves a multiplication of parts with consequent complication and liability to irregular action. For embroidering purposes the result even then would not be satisfactory, for the pattern would have a harsh and angular effect. In the improved apparatus the cards or devices controlled by them act upon two inclined planes or their equivalents, and movements in any direction and to any length not exceeding a certain limit may be given to the parts which carry the inclined planes without changing the movement of the Jacquard cylinder. It is only necessary so to arrange the device which acts upon the inclined plane or its equivalent that said device will begin its action sooner or later in the movement of the Jacquard cylinder, or upon a different part of the said plane or its equivalent. It is evident that the new improvement could be embodied in different forms of apparatus; but preference is given to an arrangement in which slotted cards are placed on the cylinder of the jacquard, and the part to be moved carries a thin wedge, which passes through a slot and is acted upon by the material at the end thereof. The material composing the card may act directly upon the edge of the wedge; but to avoid the wear upon the cards, which would ordinarily be of pasteboard or thin metal, shoes of metal are used. These may be fastened permanently to the card, or they may make a permanent part of the Jacquard apparatus and be used successively with different cards. In the latter case the shoes slide and are provided with projections which enter the slot, and when one of these projections comes to the end of the slot, as the shoe can now move no farther, the wedge is itself compelled to move and of course imparts motion to the part connected therewith. The improved jacquard is connected with the cloth-frame to shift the same, and also with the counterbalance-weight of the take-up, in order to regulate the tension put upon the thread. This Jacquard mechanism is believed to be new in and of itself, and may of course be put to any use for which it may be found suitable. It is not, however, claimed herein, except in combination with the embroidering-machine proper or elements thereof; but the said Jacquard apparatus, together with the shifter-pin and co-operating devices which give motion to the pattern-plate or pantograph apart from the said embroidering-machine or its elements, is subject-matter of a divisional and concurrent application, to wit: our application, Serial No. 209,234, filed July 27, 1886, for improvements in Jacquard and pantograph apparatus. The same is also true of the pattern-plate.

A further new improvement consists in an automatic stop mechanism for bringing the machine to a standstill when the threads become very short, or when the pattern is finished, or when it is desirable to stop the machine temporarily for any purpose connected with the pattern, as to punch holes in the fabric.

The invention also comprises certain particular constructions, combinations, and arrangements of parts, as hereinafter specified.

Having now explained the principle of the invention, what is considered the best mode of applying that principle will now be described with the aid of the accompanying drawings, which represent an automatic embroidering-machine constructed in accordance with the invention.

Figure 2:
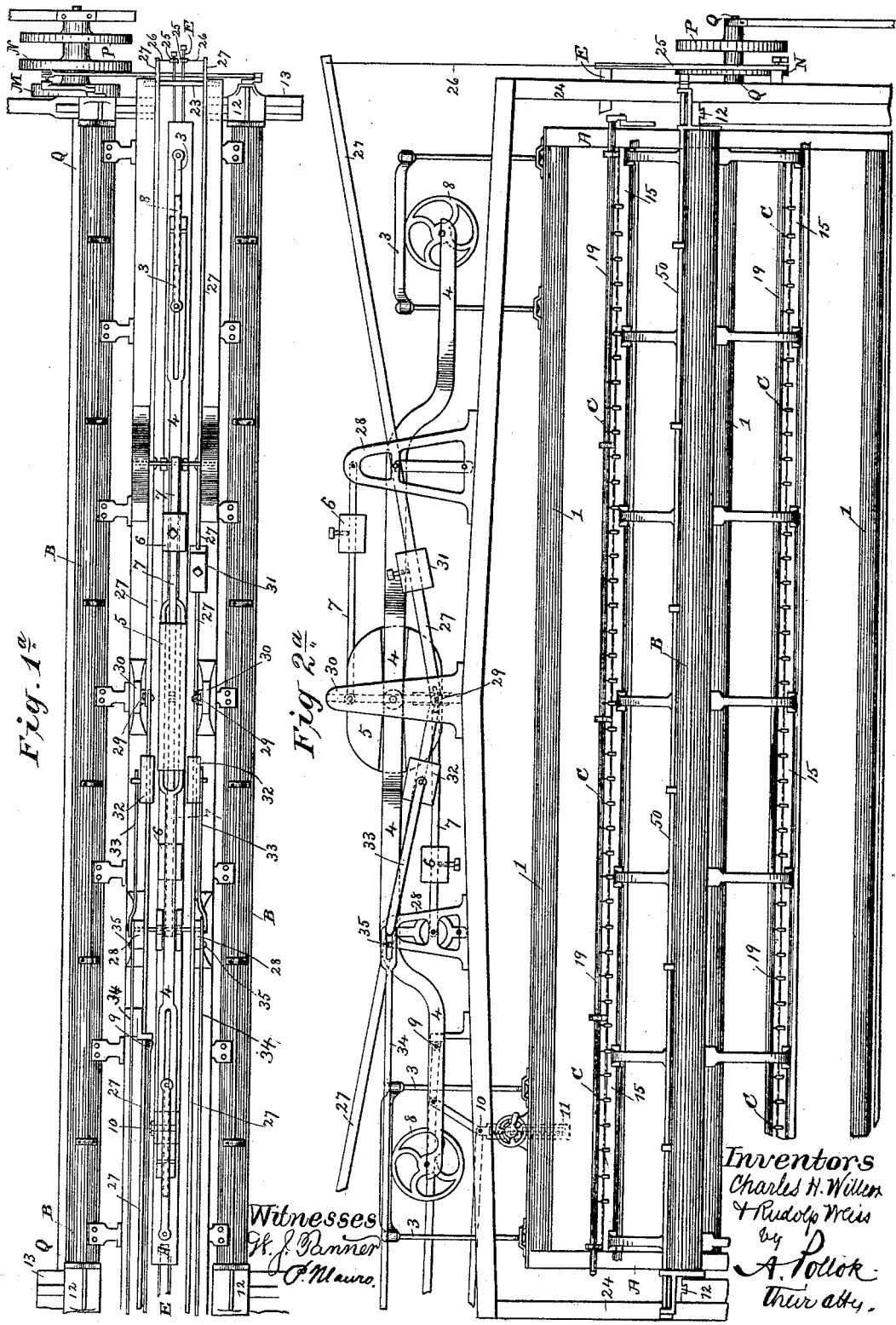
Figure 3:
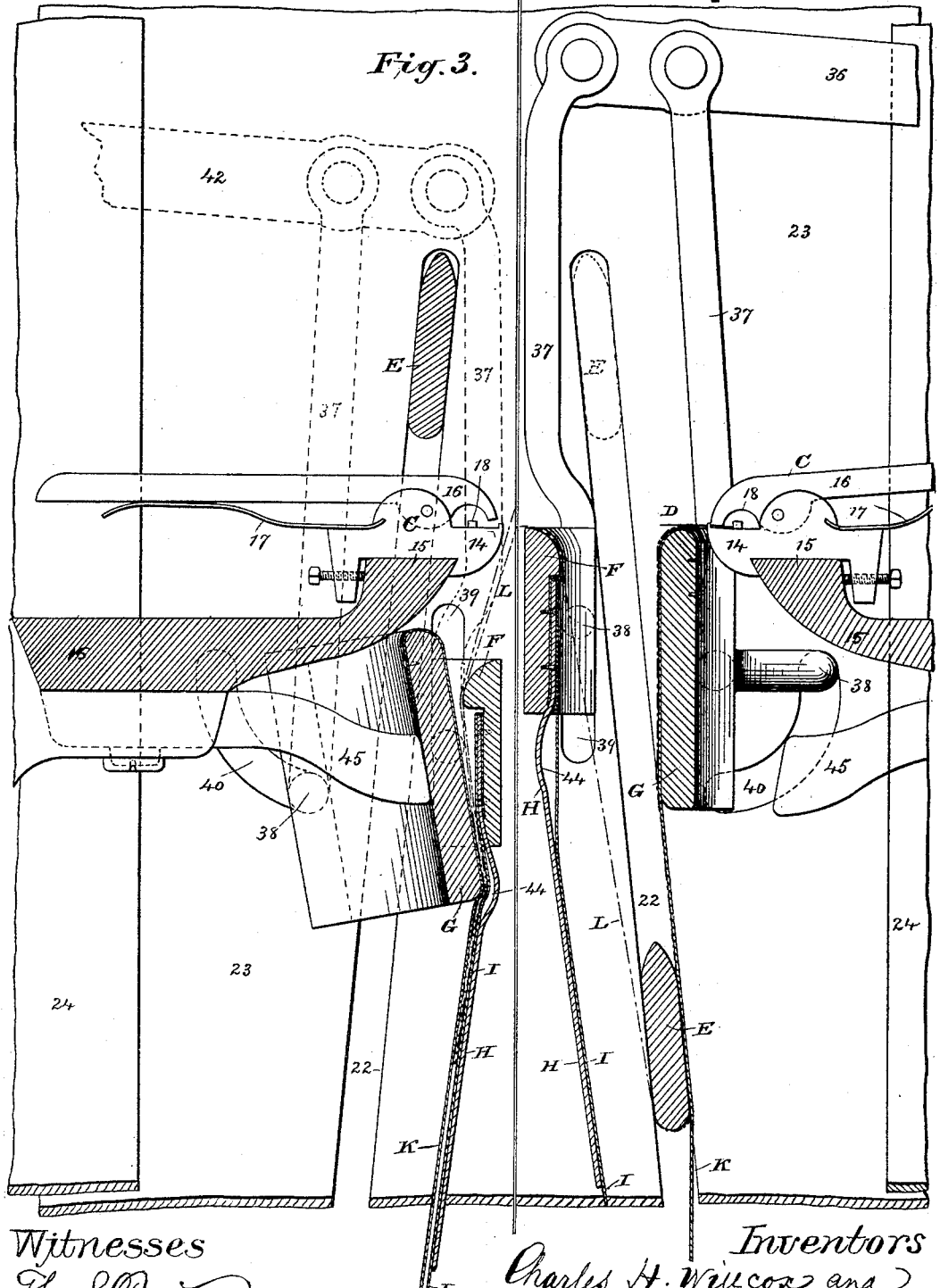
Figure 4:
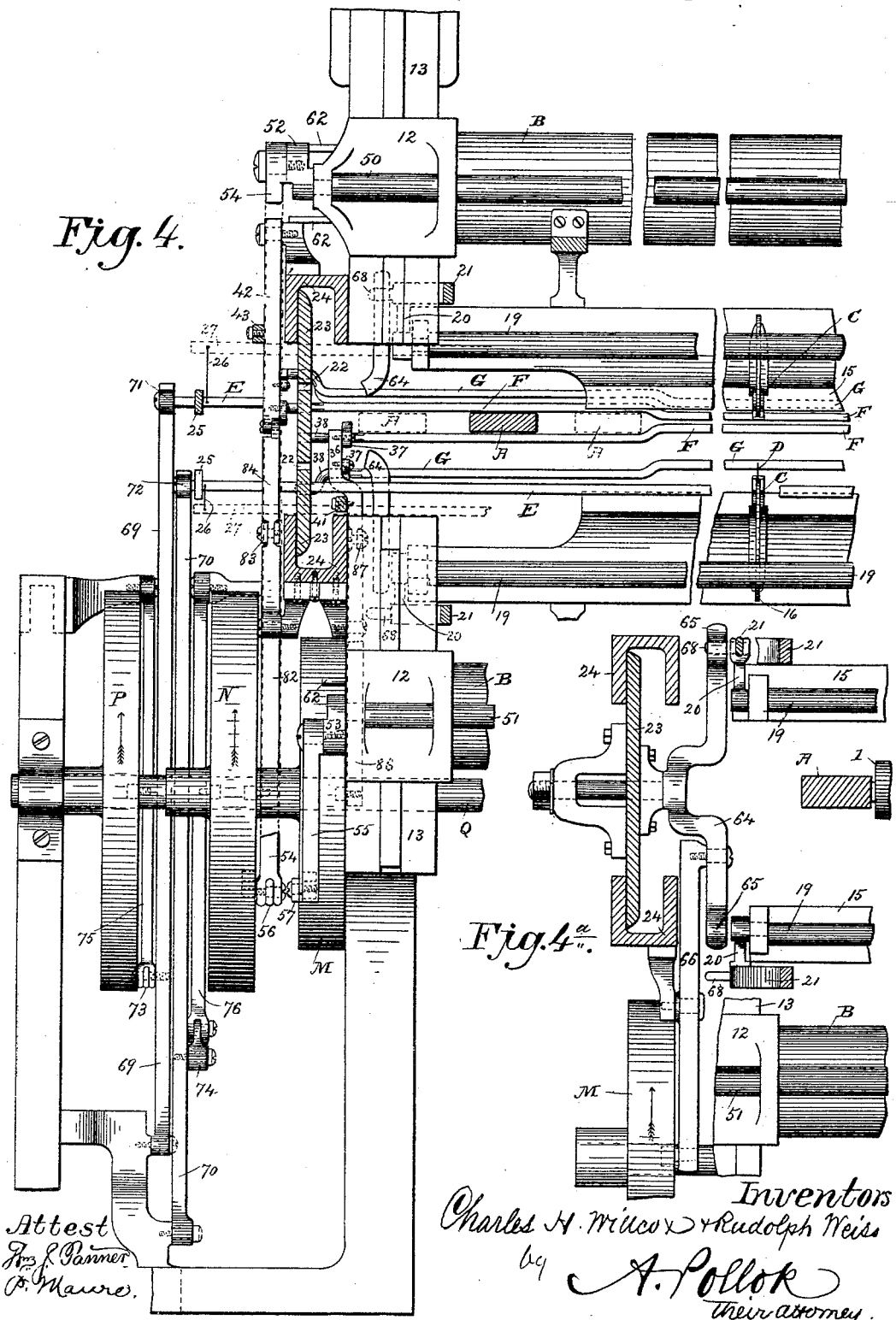
Figure 5:
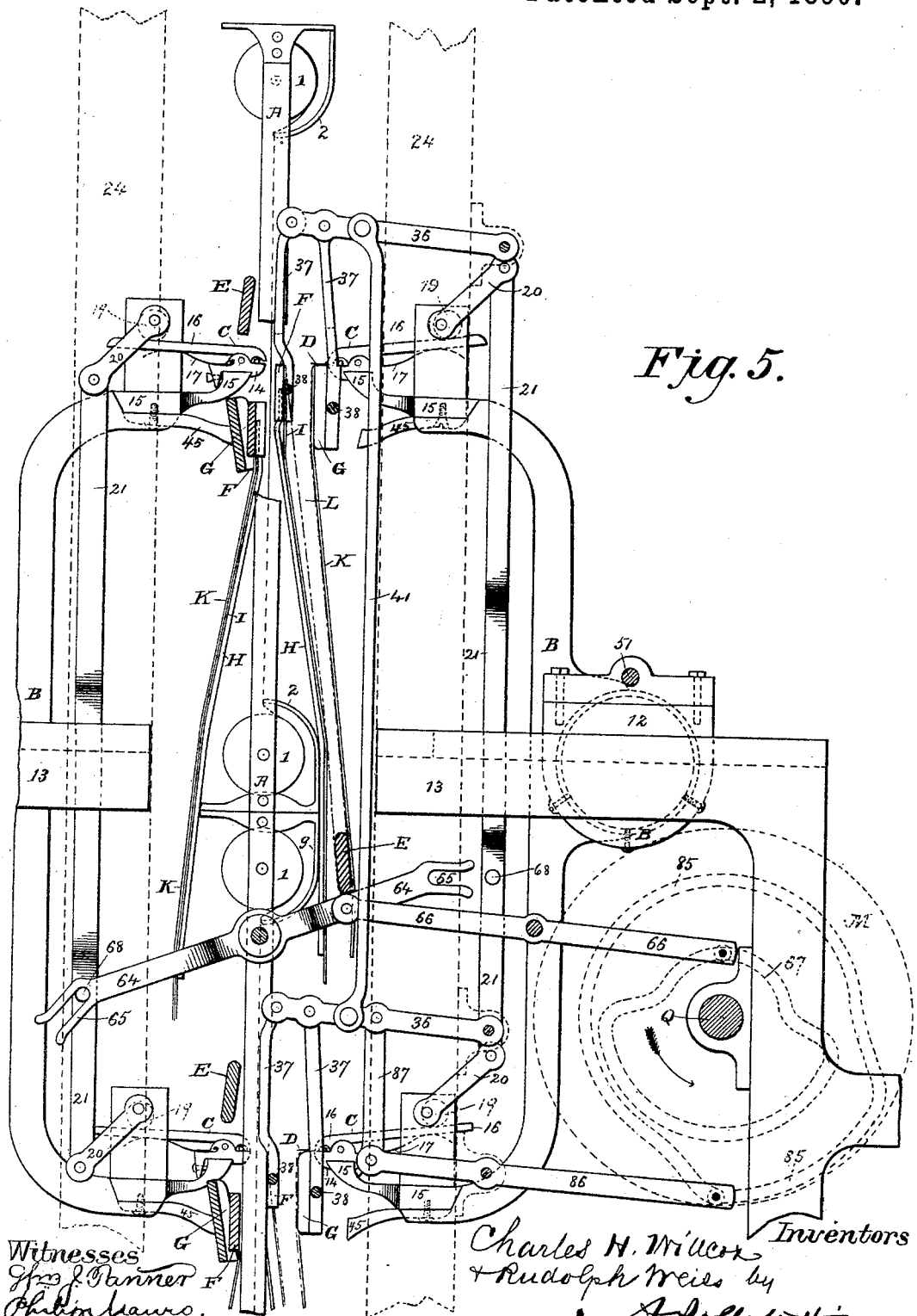
Figure 6:
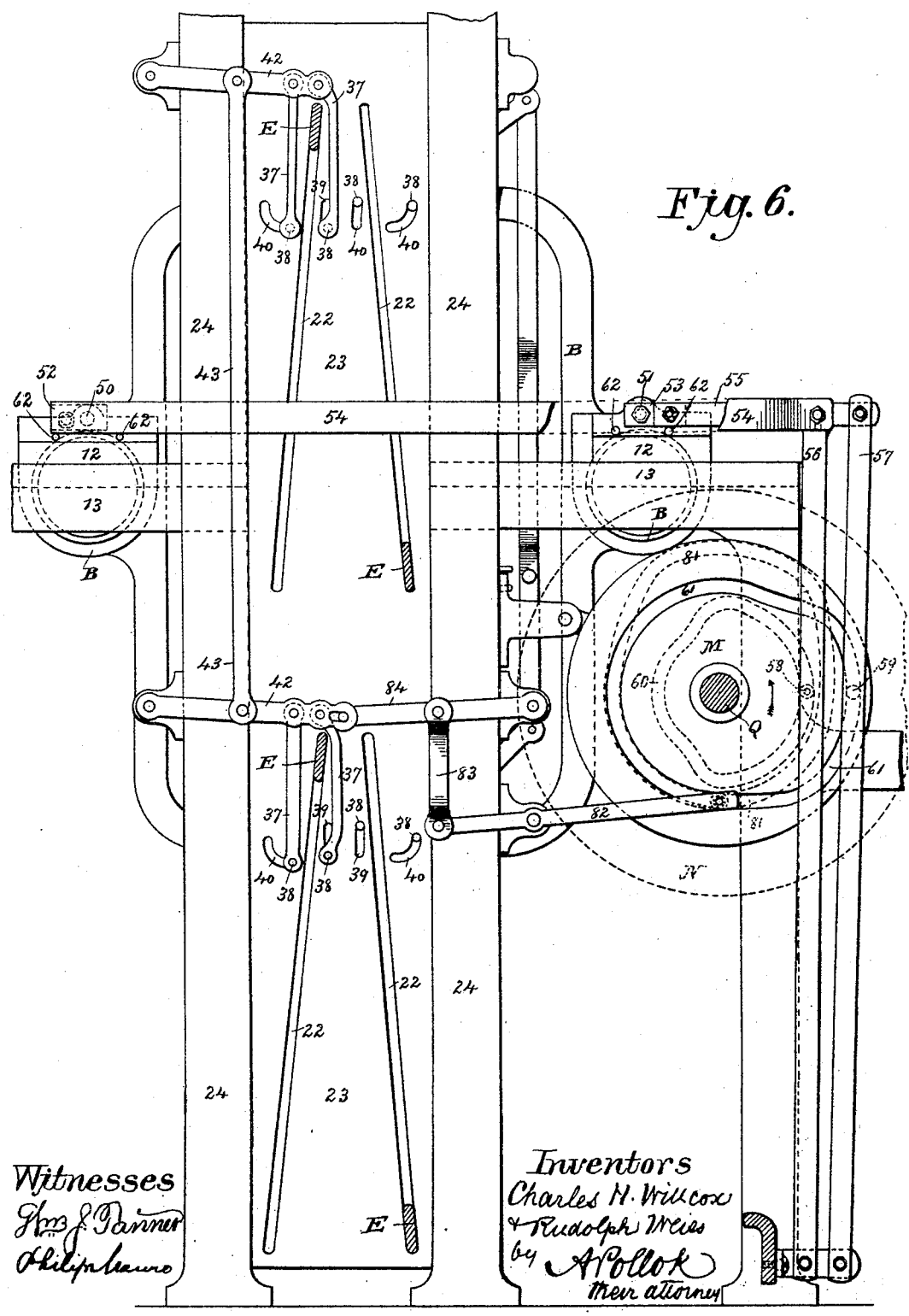
Figure 7:
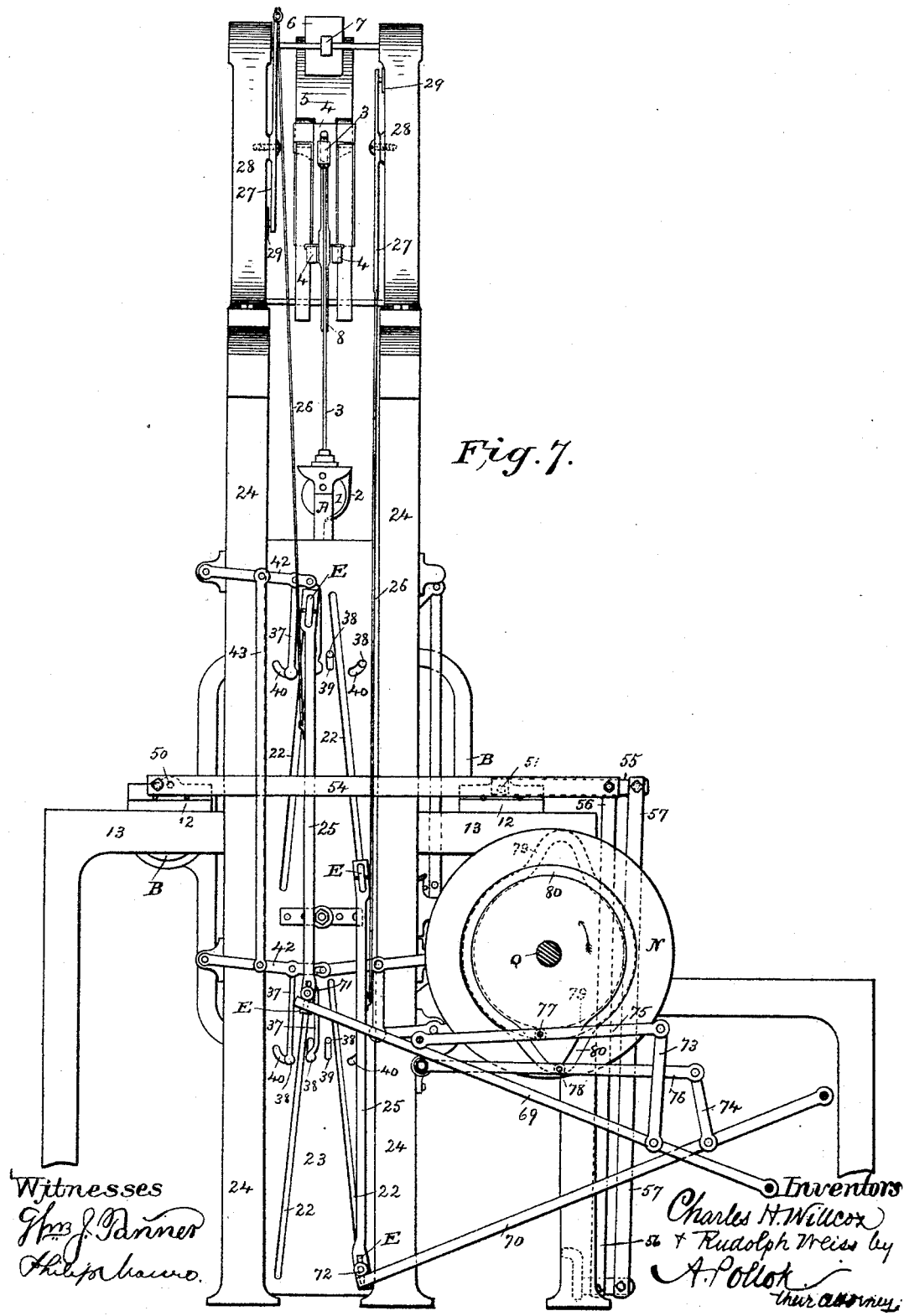
Figure 8:
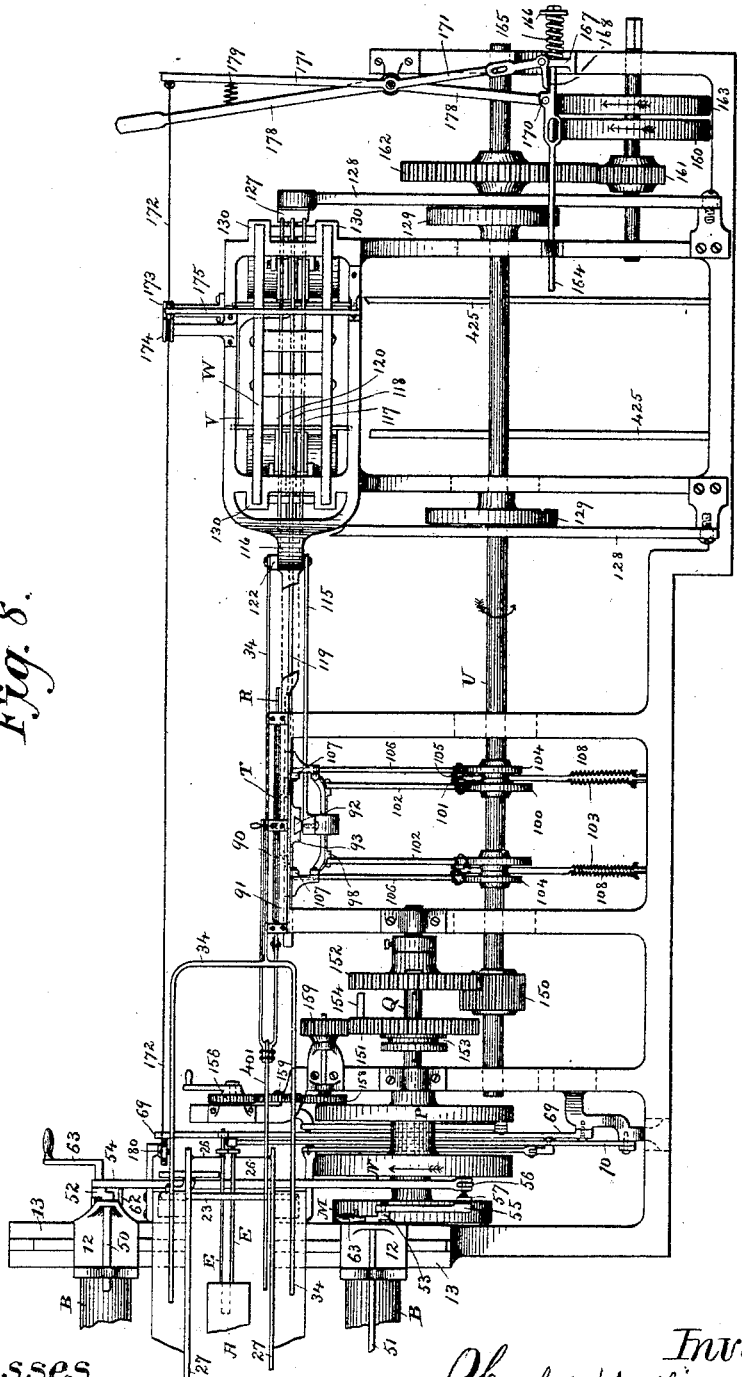
Figure 24:
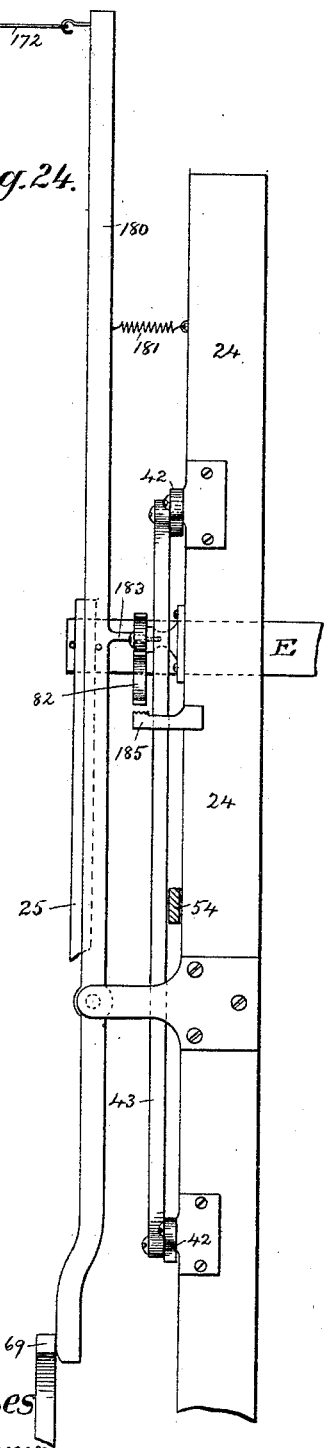
Figure 25:
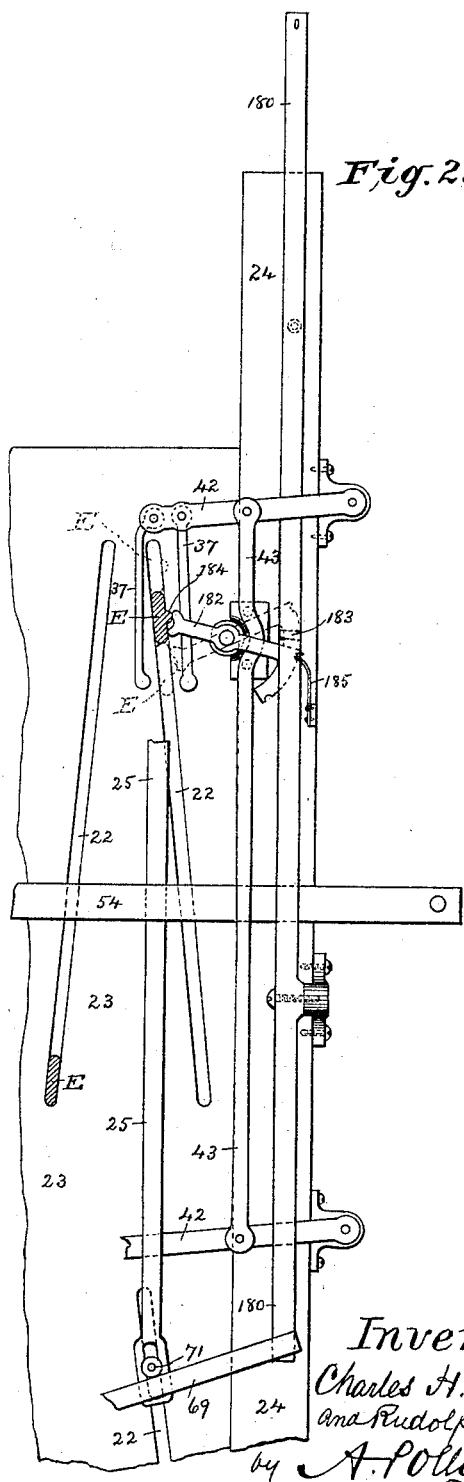

Figures 1 and 1ª, taken together, represent the machine in plan, (somewhat simplified by omission or breaking away of parts, and one end of the embroidering-machine proper being shown in both figures.) Figs. 2 and 2ª in like manner constitute a front elevation. Fig. 3 is an enlarged view in section of the stitch-forming devices, illustrating their operation. Fig. 4 is a partial view, enlarged, in horizontal section, illustrating the mechanism for operating the stitch-forming devices. Fig. 4ª is a similar view showing parts omitted or broken off in Fig. 4. Figs. 5, 6, and 7 are views in sectional elevation in different planes, illustrating the mechanism for operating the stich-forming devices. Fig. 8 is a plan as seen by a person at the back of the machine, the same illustrating the jacquard and stop mechanism and the parts more immediately connected therewith. Fig. 9 is a back elevation, partly in vertical longitudinal section, of the parts shown in Fig. 8. Fig. 10 is a view in sectional elevation in a different plane from that of Fig. 9. Fig. 11 is a vertical cross-section illustrating the arrangement of the cross-slides, pattern-plate, and shifter-pin. Fig. 12 is a vertical cross-section of the jacquard. Fig. 13 is a detail view of the shifter-pin and pattern-plate. Figs. 14 to 21 are detail views of the Jacquard apparatus. Figs. 22 and 23 are partial views in plan and vertical cross-section, illustrating the punching of the fabric to be embroidered; and Figs. 24 and 25 are views in front and end elevation, illustrating a part of the stop mechanism.

Taking the scale of Figs. 3, 13, and 17, which are the same, as four-fifths of natural size, (nine and three-fifths inches to the foot,) the scale of the other views would be: Figs. 1, 1ª, 2, and 2ª, one-eighteenth; Figs. 4, 4ª, 6, 11, 18, 19, 20, 21, 24, and 25, one-fifth; Fig. 5, one-fourth; Fig. 7, one-eighth; Figs. 8, 9, 10, 12, 14, 15, and 16, one-twelfth, and Figs. 22 and 23 two-fifths.

The two breadths of cloth or fabric to be embroidered are stretched between the beams 1 (see Figs. 1 and 2) on the cloth-frame A, the cloth being carried over the edge of the guides 2, (see Fig. 5,) so that it will be in the middle of the frame. These guides are believed to be new. The cloth-frame is suspended by hangers 3 (see Figs. 2ª and 7) from the levers 4, which at or near the middle (where they are fulcrumed) are supported by the machine-frame and at the opposite ends are connected with each other and the counterbalance-weight 5. The weight can be exactly counterbalanced by adjusting the small weights 6 nearer to or farther from the fulcrums of the lever-arms 7, which are pivoted to fixed brackets and are jointed at their outer ends to the counter-balance 5. The hangers rest upon the periphery of wheels 8, journaled each in a fork of lever 4, and can travel right and left on such wheels. The tilting of levers 4 allows the cloth-frame to be raised and lowered. The cloth-frame is moved up and down or right and left, as may be required, by means of a pantograph system of levers jointed at 9 (see Fig. 9) to brackets on top of the machine-frame and at 10 to the cloth-frame, or rather to a slide 11, which is carried by the cloth-frame, (see Fig. 2ª,) and can be moved vertically in and out by means of a rack and pinion or other suitable appliances to raise and lower the said frame independently of the pantograph. The power to move the cloth-frame is applied to the lever 401 (see Fig. 2) of the pantograph. A counter-balance 400 (see Fig. 9) is connected with the pantograph.

The carriages B, of which there are two—one on each side of the cloth-frame—each supports two rows of the nippers C. The carriages are provided with slides 12, (see Figs. 1, 1ª, and 2,) that move in ways of the horizontal arms 13 of the machine-frame. The nippers (see Figs. 3 and 5) consist each of a stationary jaw 14, fastened by set-screws to a bar 15, that extends the width of this part of the machine, a movable jaw 16, pivoted to the stationary jaw, a spring 17, acting to force up the tail of the movable jaw, so as to cause the nippers to take hold of the needle, and a stop 18, forming part of the stationary jaw to prevent the needle being inserted too far. Above the tails of the jaws 16 of the nippers C on each bar 15 is a rock-shaft 19, (see Fig. 5,) supported upon eccentric-journals. This bar extends substantially the length of the carriage. The two rock-shafts on the same carriage are connected together at each end by a rod 21, jointed to the ends of the lever-arms 20, so that the said rock-shafts are turned both together. When the connecting-rods 21 are drawn down the eccentric-shafts are turned in such direction as to open all the nippers and release the needles D previously held therein. When the connecting-rods are raised, the nippers take hold of the needles which have been inserted in them. The nippers in the back carriage (shown at the right hand of Fig. 5) are opened when those on the front carriage are closed, and vice versa. The mechanism for operating them will be explained hereinafter. So far, with the exception of the cloth-guides 2 and the means for supporting the carriages, the machine is the same as those heretofore known and used.

In connection with each row of nippers a take-up bar E is employed. These take-up bars (see Fig. 7) move in planes slightly inclined to the vertical, they being guided in their movement each by slots 22 (see Figs. 6 and 7) in the vertical end plates 23, that extend across the space between the standards 24 and form part of the machine-frame. The two take-up bars at the back of the cloth-frame are connected at each end by a rod 25, (see Fig. 7,) and each rod 25 is connected by a wire 26 with the outer end of a lever 27, (see Fig. 2ᵃ,) which is fulcrumed in a bracket 28 on top of the machine-frame on the beam at the back thereof. The levers 27 at their inner ends (see Figs. 1, 1ᵃ, and 2ᵃ) are connected with each other by means of a pin which is carried by a slide 29, moving in the bracket 30, and which passes through slots in the levers. The back take-up bars E thus move together, and their parallel and horizontal position is always maintained. The weight of the take-up bars E and the connecting-rods 25 and wires 26 is partly counterbalanced by the weights 31 and 32, (see Fig. 2ᵃ,) one on each of the levers 27. By adjusting these weights nearer to or farther from the fulcra of the levers the unbalanced weight of the bars can be increased or diminished. The weight 31 is provided with a set-screw, so that it can be adjusted by hand. The weight 32 is made capable of sliding on the lever, and is connected by a link 33 with one arm of the forked rod 34. This arm is supported at the inner end by the pin 35, fixed in the bracket 28, which supports the weighted lever. By moving the rod 34 endwise the weight is shifted. This is done automatically by a Jacquard apparatus hereinafter described.

The front take-up bars are supported and counterbalanced precisely as described for the back take-up bars, except that the levers are carried by the top beam at the front of the machine-frame. The sliding counterbalance-weight 32 for the front take-up bars is connected with an arm of the same rod 34, so that the weights 32 for both sets of take-up bars are adjusted together by the jacquard. Ordinary friction devices can be used to retain the sliding weight in whatever position it may be placed until sufficient force is applied to change it.

In connection with each take-up bar E there are employed two bars F G, (see Figs. 3 and 5,) which constitute thread-supports on either side of the take-up bars. When it is required to take up slack of threads, the bar E drops between them and carries down the threads which rest upon the top of the bars F G and are drawn over the inner bar F. The bars F G back of the cloth-frame are supported at each end by the levers 36, to which the arms 37 are jointed. The bars F G are fastened rigidly to said arms. Pins 38 on the ends of the bars pass through slots 39 and 40 (see Fig. 3) in the end plates 23 of the machine-frame. The slots 39, through which the pins of bars F pass, are straight. The slots 40, which receive the pins of the bars G, are curved. The levers 36 at the same end of the machine are connected by the rod 41, (see Fig. 5,) so that all the thread-supporting bars back of the cloth-frame are raised and lowered together.

The thread-supporting bars F G in front of the cloth-frame are supported from the levers 42 (see Figs. 6 and 7) in the manner described for the back bars with respect to the levers 36. The levers 42 are, however, arranged outside instead of inside the end plates 23, and the arms 37 depending therefrom are consequently fixed rigidly to the outer ends of the pins 38.

The levers 42 at each end of the machine-frame are connected with each other by a rod 43, so that both pairs of bars F G in front of the cloth-frame move up and down together.

The inner thread-supporting bars F have attached to each of them a metal plate H, (see Fig. 3,) and outside of said plate is a cloth I. From each of the outer thread-bars G depends a cloth K. In each plate H, opposite the lower edge of the bar G, is a bend or concavity 44, extending the full width of the plate. Behind each bar G is a series of pushers 45, bolted or otherwise fastened to the bar 15 on the nipper-carriages. These pushers, when the nipper-carriages advance, strike the bars G and swing them forward, so that the lower edges of said bars bend the cloths I slightly into the grooves or concavities 44 in the plates H.

The operation of these parts, which constitute, so to speak, the heart of the machine, is as follows, reference being had particularly to Fig. 3: Supposing that the needles D (each provided with the thread L, one end of which is fastened to the cloth and the other in the eye of the needle) are held in the nippers C of the front carriage B, and that the latter is at the farthest distance from the cloth, the cloth-frame is then shifted and the front carriage is advanced, thrusting all the needles through the fabric being embroidered. Previous to this movement the take-up bars E have been lowered and raised, and during the movement the front thread bars or supports F G have been lowered out of the path of the advancing carriage, as shown at the left of said Fig. 3. The doubled threads L from all the needles also hang down between the cloths I K. During the advance of the front carriage the pushers 45 swing forward the outer bars G, as shown. Thus a slight friction is put upon the threads confined between the cloths I K, the object of which is to prevent the threads kinking when drawn through from the other side.

In thrusting the needles through the fabric they are inserted into the nippers of the back carriage which is then in its forward position, the nippers being open. At this time, also, the back take-up bars E are at the top of their movement and the back thread bars or supports F G at the bottom of their movement.

The nippers of the front carriage now open, those of the back carriage close upon the needle, and the back carriage begins to retreat, the thread being drawn through the fabric. During this retreat the back thread bars or supports are raised, as shown at the right in Fig. 3, until their upper edges are about on a level with the threads which are stretched between the fabric and the needles. The take-up bars E are allowed to descend, and coming into contact with the threads they carry the same with them between the cloths I K at the back of the machine, taking up the slack on the opposite side. As soon as all the threads have been drawn through the fabric the motion of the take-up bars is arrested by the threads themselves. The take-up bars rest upon the threads until in the revolution of the machine said bars are again lifted to the top of their course. As they are raised the cloths K drop upon the cloths I and retain the doubled threads. The back thread bars or supports are lowered, the cloth-frame is shifted, and the back carriage is moved forward and thrusts the needles through the fabric into the nippers of the front carriage, which since the nippers opened to release the needles has remained stationary. The nippers of the back carriage now open, those of the front carriage close, and the operations just described take place in front of the fabric. The movements are imparted to the nippers, to the nipper-change for opening and closing the nippers, and to the take-ups and the thread-supports from cam-grooves in the faces of the cam-disks M N P on the main shaft Q. These cam-disks, as well as the levers and other connections through which they operate, are duplicated at each end of the machine, and it will therefore be necessary to describe the mechanism at one end only. The nipper-change may, however, be used at one end only with but little disadvantage.

On each carriage there is a shaft, numbered 50 on the front carriage and 51 (see Fig. 1) on the back, which shaft extends the full length of the carriage and is at each end connected by a crank-arm 52 or 53 (see Figs. 4, 5, and 6) and a link 54 or 55 with an upright lever 56 or 57, pivoted at the bottom to a bracket of the machine-frame, jointed at the top to the link aforesaid, and at or near the middle carrying a pin or roller 58 or 59, (see Fig. 6,) that projects into and is acted upon by the cam-groove 60 or 61 in the inner face (right hand, Fig. 4) of disk N or outer face of disk M, respectively. The groove in disk N is shown in dotted lines, Fig. 6, being in front of the plane of that figure. Pins 62 limit the movement of the crank-arms. The object of these crank-arms, it may be here explained, is to enable the operator to draw back the nipper-carriages when the main shaft is disconnected. To accomplish this the handles 63, (see Figs. 1, 2, and 8,) which are fastened rigidly to the crank-arms at one end of the carriages, are thrown over, so as to turn the crank-arms through a semicircle. The object of moving the carriages by hand is to give the operator freer access to the stitching devices and also to enable him to punch the holes in the fabric, which are often required. A bar 300 (see Figs. 22 and 23) is hinged by a series of arms to the bars 15 of the front carriage, and on this bar 300 are fastened a series of punches or stilettos 301 by screws or otherwise. A similar bar 302, to which is fastened a series of counterparts or dies 303, is hinged to each of the bars 15 on the back carriage. Normally both bars are turned back, as shown in dotted lines, Fig. 23. For punching, the carriages are drawn back by the handles 63, (see Figs. 1 and 2,) and are further moved back about midway of their course by turning the shaft Q (see Figs. 2ª and 9) by hand. The gearing for turning shaft Q is explained hereinafter. When thus drawn back the bars 300 and 302 may be turned down without interference from the take-up bars E. When moved forward as far as they can by turning the shaft Q, they occupy the position shown in full lines, Figs. 22 and 23. The front carriage can then be advanced more or less, as desired, by means of the handles 63. Bars having the stilettos and dies differently spaced can be used for different patterns or the stilettos and dies can be adjusted on the bars. For adjustment the fastening-screws may pass through slots and be tapped into one or another of a series of holes.

A bent wire is commonly used in embroidering scallops to produce what is known as a "button-hole stitch." This wire is supported in front of the cloth-frame and is operated from other parts—say the nipper-carriages. The wire may be used in the present new or improved machine, being arranged and operated as heretofore in the hand-machines. As the wire and its mechanism have no direct connection with the invention, since the machine can be used without them, and as their presence would only complicate the drawings, they are omitted.

The nipper-change (see Figs. 4ª and 5) comprises a lever 64, having forks 65 at each end, which lever is pivoted inside of the end plate 23, and a lever 66, pivoted to a bracket on the machine-frame. The lever 66 is connected at the inner end by a slot and pin with the lever 64 and is acted upon at the outer end by the groove 67 in the inner face of the disk M. When the nipper-carriages are in their forward position, or position nearest the fabric, a pin 68 on each connecting-rod 21 enters the corresponding fork 65, and the levers 64 and 66 are then tilted to open and close the proper set of nippers.

The front and back take-ups E (see Figs. 4 and 7) are lifted by the levers 69 and 70, respectively, pivoted at the outer end to a bracket on the machine-frame and at the inner end projecting under a roller 71 or 72 on the end of the lower take-ups. These levers 69 and 70 are connected at the middle by links 73 and 74, respectively, with the outer ends of levers 75 and 76, which are pivoted at the front or inner ends to brackets on the machine-frame, and are provided at the middle with pins 77 and 78, which project, the pin 77 into a groove 79 in the inner face of disk P and the pin 78 into the groove 80 in the outer face of the disk N.

The front thread bars or supports F G, Figs. 4 and 6, are raised and lowered by the action of the groove 81 in the inner face of the disk N through the lever 82, link 83, and lever 84. The lever 82 is pivoted at the middle to a bracket on the machine-frame, is acted upon at the rear end by the cam-groove 81, and at the front end is connected by the link 83 with the lever 84. The latter is pivoted at the outer end to a bracket on the machine-frame, and at the inner end is connected by a slot and pin with the lower lever 42, from which the lower front thread-bars depend.

The back thread bars or supports F G (see Figs. 4 and 5) are raised and lowered by the action of the cam-groove 85 in the inner face of the disk M through the lever 86 and link 87. The lever 86 is pivoted at the middle to a fixed bracket. Its outer end is acted upon by the cam-groove, and the inner end is connected by the link 87 with the middle of lower lever 36, from which the lower pair of bars depend.

The cloth-frame is shifted at the proper time by an arrangement of cross-slides which are operated by the Jacquard apparatus. (See Figs. 1, 2, 8, 9, 10, and 11.) The lever-arm 401 of the pantograph is forked, and the back member fastened to a perforated pattern-plate R, which is supported between the two upright frames or standards 90 and 91. The holes in this plate represent the pattern, and they are so arranged that when brought successively to a certain center or fixed point the cloth-frame is shifted to present the fabric in correct position before the needles. The shifter-pin S, (see Fig. 10,) by which the pattern-plate is moved, is supported on cross-slides, the one 92 which carries the shifter-pin being movable in upright ways (see Figs. 10 and 11) of the slide 93, and the latter movable in horizontal ways of the frame 91. By the combined movements of these slides the shifter-pin can be moved in any desired direction. The pattern-plate is carried with it or remains stationary, according as the shifter-pin is or is not inserted in a hole in said plate. The shifter-pin is set in a holder 94, (see Fig. 11,) being screwed into the same, so that it can be removed at any time. The pin-holder slides in a boss on the slide 92, and is connected by a groove and collar with the end of a lever 95, which is fulcrumed in a bracket on the back of slide 92. A compression-spring 96 tends to turn the lever so as to force the pin into the pattern-plate. The pin is withdrawn by pressing in the tail or lower end of the lever, for which purpose there is a small plate 97, suspended above the said end by arms 98 from brackets 989, fixed to a cross-bar of frame 91. (See Figs. 9 and 11.) It is swung in to operate the lever. When the pin is withdrawn, the pattern-plate is held stationary by a presser-foot T at the end of a lever 107, (see Fig. 9,) which is fulcrumed to brackets on the frame 91. The pressing-surface surrounds the shifter-pin at such distance as not to interfere with its movement. There are bearings or projections 988 (see Fig. 11) on the inner face of the standard 90 opposite the corners of the presser-foot to hold the pattern-plate in front.

The action of the apparatus is as follows: The shifter-pin being in its central position opposite a hole in the pattern-plate, the lever 95 is released by withdrawal of the plate 97, and the spring 96 forces the pin into the hole opposite. The cross-slides are then moved by suitable mechanism, as hereinafter explained, slide 93 horizontally and slide 92 vertically, or rather said slide 92 is carried by slide 93 both horizontally and vertically in such direction and to such distance that the succeeding hole comes opposite the central point. Of course, if the hole is immediately above or below the other, the slide 92 only will be moved, and if it be in the same horizontal line the slide 93 will be moved and no independent movement be given to slide 92. The presser-foot moves inward to bear upon and clamp the pattern-plate, and the shifter-pin having been withdrawn is returned to the central position by moving the slides 92 and 93 back to their former position. It is then advanced and shifted to give the next movement to the pattern-plate and cloth-frame. The point of the shifter-pin is conical, so that if the hole in the pattern-plate should be slightly out of position it is centered accurately by the insertion of the pin. The movements of the shifter-pin are controlled by the cams 100 on the shaft U, which cams act upon the ends of vertical levers 101, fulcrumed at the bottom to fixed brackets and connected at the middle by means of the rods 102 with the lower ends of the rods 98. Springs 103 return the said parts and retain the rollers at the top of levers 101 in contact with the levers. The movement of the presser-foot is controlled by the cams 104, which act upon the upper ends of levers 105, connected by rods 106 with the lower end of lever 107, which is divided or forked. The tension-springs 108 return the levers and force the presser-foot against the pattern-plate. The cross-slides are each connected with wedges 110 and 111 (see Fig. 20) for the slide 92 and 112 and 113 (see Fig. 9) for the slide 93. In Fig. 9 the wedge 110 is broken away to show the wedge behind. A connecting-rod 114, (see Fig. 11,) jointed at the bottom to the lower end of slide 92 and bent outward at the middle, so as to pass around behind the bearingplate 97, is jointed at the top (see Fig. 9) to the horizontal arm of the bell-crank or bent lever 115, which is fulcrumed to the upright bracket 116, making part of the Jacquard frame. The vertical arm of lever 115 is connected by slot and pin with the slide 117, which moves in ways of the Jacquard frame and carries the wedges 110 and 111. The similar slide 118, which carries the wedges 112 and 113, is connected directly with the slide 93 by an arm 119. The arm may be a continuation of the slide 118. In the Jacquard frame there is also a third slide 120, (see Fig. 2,) which carries a single wedge 121. It is connected by slot and pin with the lower end of the upright lever 122, fulcrumed upon the front of the bracket 116. The upper end of the lever 122 is jointed to the end of the rod 34 (see Fig. 1) for adjusting the weights 32. Below the wedges is the Jacquard cylinder V, of eight sides, and with three slots in each side, corresponding with the three wedges under the three slides. The shaft of the cylinder is journaled in boxes 123, (see Fig. 10,) which slide in ways of the frame. The ends of the shaft project. On one end are fixed the notched wheel 124 (see Figs. 9 and 10) and the ratchet-wheel 125. On the opposite end is fixed the eight-sided wheel 126. Both ends pass through holes in the arms 127 of the yoke W and slots in the ends of levers 128, but are free to turn therein. The yoke and the Jacquard cylinder are lifted together by the action of the grooved cams 129 (see Fig. 1) upon the levers 128, which are pivoted at the back end in brackets of the machine-frame. The yoke is guided in its up-and-down movements by the side bars thereof, which travel through lugs 130 on the frame. As the Jacquard cylinder descends the ratchet-wheel meets the pawl 131, (see Fig. 9,) pivoted at the bottom of the frame, and is turned through one-eighth of a revolution. During the succeeding rise of the cylinder the spring 132, which is fastened to the frame at the bottom and at the top bears against the wheel 126, prevents its turning until the ratchet-wheel leaves the pawl, when the notched wheel 124 meets a dog 133, that enters one of the notches and thus holds the cylinder positively. The dog is lifted with the wheel. It slides in ways of the standard making part of the frame. A stop limits its descent, so that it is clear of the notch before the ratchet-wheel is in position to be turned by the pawl. The cards X, connected together in a chain, pass around the cylinder, a pin 134 (see Fig. 9) at each end of the cylinder entering a hole 450 (see Fig. 10) in the end of the card. The cards also are confined between the flanges at the cylinder ends. In each card are three slots. When the cylinder is raised, the three wedges 111, 113, and 121 enter each one of the slots in the card and also the corresponding slot in the Jacquard cylinder, and are moved in one direction or the other, according to the position of the slots. In the face of the cylinder are sliding shoes 136, (see Figs. 9 and 10,) which are arranged in pairs, one pair below the wedge 111 and a second pair below the wedge 113. At the abutting ends of the shoes of each pair are projections, and the ends themselves are inclined, (see Fig. 19,) so as to be parallel with the edges of the wedge. When a card is on the cylinder, the projections pass through the slots therein. To allow the projections to enter, the slots are enlarged at the middle of the cylinder. When the cylinder is raised, the wedges 111 and 113 each enter between the ends of the corresponding shoes and push one or both outward until the projection on one of them reaches the end of the slot. As it can move no farther, the wedge is pushed in the opposite direction, carrying the other shoe with it and moving the shifter-pin, the pattern-plate, and the cloth-frame. It will thus be seen that the end of the slot nearest the middle of the cylinder alone has an effect upon the wedge, and that the nearer it is to the middle the farther the wedge is moved, because as the positive action begins nearer to the point it is through a greater distance. The movement of each wedge depends solely upon its own slot. One or both the wedges may be moved. A horizontal movement is given to the cloth-frame if the wedge 113 only be moved, a vertical movement if the wedge 111 only, or an oblique movement if both are moved. Whether the movement of the cloth-frame shall be right or left from the previous position depends upon which end of the slot for wedge 111 is nearest the middle. If the outer (left hand, Figs. 1 and 2) be nearer, the cloth-frame is moved to the right, as represented in those figures. If the inner end be the nearer, the cloth-frame is moved in the opposite direction. If they are the same distance, the cloth-frame has no horizontal movement. The position of the slot for wedge 113 determines whether the cloth-frame shall be moved up or down. If the outer end be nearer the middle, the frame goes up. If the inner end be nearer, the frame goes down. If both are the same distance, there is no vertical movement. When the cylinder descends, the shoes are pushed in by the levers 137 as fast as the receding wedge permits. Each of these levers is fulcrumed at the bottom, and is combined with a spring 138, that tends to move it inward. At the top the lever is broad, so as to bear upon the ends of the shoes. After the shoes leave the wedges, which is just before the cylinder commences to turn, the ends of the shoes pass behind the fixed plates 139, which retain them in a central position until they are again pushed out by the wedges on the ascent of the cylinder. The fixed plates form the end bearings to the Jacquard cylinder. The yoke W being drawn down with the cylinder, the cross-bars 140 (or one of them) come in contact with the corresponding edge of the upper wedges 110 and 112, and return them, together with the shifter-pin, to the central position. The wedge 121 (see Figs. 1 and 12) acts directly upon the end of the slot in the card, or rather against a shoe 141, (see Fig. 18,) which is there fastened to the card. The sliding shoes 136 on the cylinder are not used to act upon the wedge 121, because it is not convenient to return the wedge at each descent of the cylinder, and if not returned the sliding shoes—supposing a pair placed on each face of the cylinder for acting upon wedge 121—being returned by the levers 137, one of them would on rising again come square against the point of the wedge. It is evident, however, that a second wedge could be placed on the top of the slide 120, and then the sliding shoes could be used. In that case the cams 129 should be changed so as to hold the cylinder at the top of its movement until the take-ups have about completed their action and the timing of the apparatus would be altered.

Instead of placing the sliding shoes on the cylinder under the cards they may be placed above the same and be connected with the wedges on the slides that carry them. This arrangement answers equally well whether the slides that carry the wedges are or are not returned. It is shown in Figs. 20 and 21. The shoes 142 slide in grooves 143 in the wedge, parallel with the edge thereof. The shoes are thicker than the wedge. The slot in the card is equal in width to the thickness of the shoes, and the slot in the cylinder to the thickness of the wedge. When the cylinder rises, therefore, the shoes pass through the card and rest upon the face of the cylinder. Further rise of the cylinder forces the shoes toward the ends of the slot in the cards, the wedge passing through the slot in the cylinder. A pin 144 limits the movement of the shoes downward on the wedge.

It is not essential to use sliding shoes for any of the slots; but each slot could be protected by a stationary shoe, such as 141, and, except for the wear upon the end of the slots, shoes of all kinds could be dispensed with. If the cards were of thick metal, as they may be, shoes would be of less importance.

The shaft U is geared to the main shaft Q by means of the long pinion 150 (see Fig. 1) on shaft U meshing with the gears 151 and 152 on the shaft Q, which gears have just double the teeth of the said pinion. The gear 152 is loose on the shaft Q. The gear 151 is connected therewith by a spline, so that it may be moved longitudinally to engage with or become disengaged from the pinion. A fork in the groove 153 in the boss of said gear may be used to shift the gear. The apparatus is thus the equivalent of a clutch.

In order to insure the proper registry of the gear and pinion, there is a pin 154 on the side of said gear, which prevents the gear from being moved into engagement with the pinion unless it registers with the hole in the gear 152.

The object of disengaging the shafts Q and U is to enable the operator to work the embroidering-machine proper by hand. This he does by the train of gears 156, (see Fig. 8,) 157, 158, and 159, the first of which he turns with a crank and the last of which engages the gear 151. It is fixed to one end of a short shaft, to the opposite end of which the gear 158 (see Fig. 1) is affixed. The cloth he shifts by the handle on the end of the pantograph-arm 401, which he moves over the stationary pattern 460, as customary in hand-machines. The shaft U is driven by a belt on the fixed pulley 160 through the gears 161 and 162. There is a loose pulley 163, onto which the belt is shifted when it is desired to stop the machine. Means are provided for shifting the belt automatically when the pattern is complete, or when the fabric is to be punched, or other operation to be performed by hand, or when the threads become short, so that it is necessary to renew them. The belt-shipper consists of a sliding shipper-bar 164, having the usual yoke or fork to embrace the belt. A spiral compression-spring 165 is confined between the plate 166 at the end of the bar and a bracket 167 on the frame. The pressure of the spring is resisted by a trip-pawl 168 (see Fig. 8) in the form of a bell-crank pivoted to the bracket 167, with one arm in the path of the lug 170 on the shipper-bar. The other arm of the bell-crank is connected by a slot and pin with the lever 171, fulcrumed on the machine-frame. A wire 172 is fastened at one end to the outer extremity of the lever, and is led around the pulleys 173 and 174 to the end of the upright lever 180, fulcrumed in a bracket on the standard of the embroidery-machine. Between the pulleys 173 and 174 the wire is fastened to the front end of lever 175, which at the rear end is fulcrumed in a bracket of the Jacquard frame. A rod 176 (see Fig. 9) is jointed to the under side of the lever and hangs down just above the hole 177 (see Fig. 17) in that face of the cylinder which at the time is uppermost. If the card has a corresponding hole 455, the rod 176 passes freely through both and the lever 175 is not affected. When, however, a card comes uppermost that has no perforation at that point, as shown in Fig. 17, which occurs at the end of the pattern or whenever a hand operation is to be performed—as punching, for example—the solid card comes into contact with the end of said rod, and the cylinder lifts it and the lever 175, drawing on the wire 172, turning the lever 171 and trip-pawl 168, and releasing the shipper-bar, whereupon the spring 165 expands and moves the belt to the loose pulley. The shipper-bar can be returned by means of the lever 178, (see Fig. 2,) fulcrumed to the frame and jointed at the outer end to the shipper-bar. A compression-spring 179 (see Fig. 8) returns the lever 171 and trip-pawl 168 when the lever 178 is moved. The lever 180 (see Fig. 9) is combined with a tension-spring 181, (see Fig. 24,) which tends to turn it in the direction for releasing the trip-pawl.

It is ordinarily prevented from moving under the action of this spring by one or the other of two levers. When the front take-ups are near the top of their movement, the end of the lever 69, (see Fig. 25,) which lifts them, places itself at the side of the lever 180 and prevents its turning. As the front take-ups descend, the upper take-up bar engages and turns the lever 182 into the position shown in dotted lines, Fig. 25, so that the front end lies behind the projection 183 on the lever 180 and prevents its moving. The lever 182 has a notch in the back end, and a teat or projection 184 in the front of the take-up bar enters said notch and turns the lever. When it ascends it turns the lever 182 into the position shown in full lines and no longer lies behind the projection 183. The spring 185 engages a notch in the front end of lever 182 and retains it in either position until it is moved therefrom by the take-up bar. During the operation of the machine the lever 180 is prevented from moving now by the lever 69 and now by the lever 182. As the threads get shorter, however, the take-up bar has a less and less movement until finally it no longer moves the lever 182 into the path of the projection 183, whereupon as soon as the lever 180 is released by the lever 69 the spring 181 turns it, draws on the wire and releases the trip-pawl 168, shifts the belt, and stops the machine.

The operation of the machine will be understood from the foregoing description; but a brief synopsis of the motions during one revolution of the shaft Q (two revolutions of shaft U) may not be amiss. In the position represented in Figs. 5, 6, and 7, which is some ten degrees past that of Fig. 3, ninety degrees before or behind that in Figs. 8 and 11, and some thirty degrees behind that in Figs. 9, 10, and 12, a stitch has just been completed—that is to say, the back take-ups have just drawn through the thread from the opposite side and tightened the stitch. The front carriage is in its forward position with the nippers open. The front take-ups are up and the front thread-bars down. They have remained in that position for ninety degrees of revolution, (except the nippers which opened during the first fifteen degrees of the quarter-revolution,) and they will so remain during the next ninety degrees. The cloth-frame, pattern-plate, and sliding tension-weights have remained in their present position for one hundred degrees, (two hundred degrees of shaft U) and will not be moved during the next thirty degrees, (sixty degrees of shaft U.) The cross-slides and shifter-pin have occupied the central position, the back carriage has been at its farthest limit of motion, and the back thread-bars have been up for thirty degrees, (sixty degrees of shaft U,) and they will all remain in that position for the next thirty degrees. During the revolution of shaft Q thirty degrees from the position of Figs. 5, 6, and 7 the back take-ups are lifted to the top of their slots, the shifter-pin which had been out of the pattern-plate for sixty degrees (one hundred and twenty degrees of shaft U) enters the hole in the pattern-plate which is then central or opposite the point of the shifter-pin, the presser-foot is raised clear of the pattern-plate, and the Jacquard cylinder is lifted up to the points of the wedges. (See Figs. 9, 10, and 12.) The inward motion of the back carriage, the dropping of the back thread-bars, the shifting of the cloth-frame and pattern-plate, and the shifting of the tension-weights for the succeeding stitch take place simultaneously during the next sixty degrees, (one hundred and twenty degrees of shaft U.) During this period the Jacquard cylinder is lifted to the top of its movement in order to shift the cloth-frame, pattern-plate, and tension-weights, and this operation has been completed some ten degrees before the back carriage reaches the inward limit of its movement—that is to say, before the needles reach the fabric. During the next fifteen degrees the nippers on the back carriage open and those on the front carriage close upon the needles, and then in the succeeding forty-five degrees the front carriage is moved to its outward position, where it is to remain motionless for sixty degrees. Simultaneously with the change in the nippers the Jacquard cylinder began to descend, and in thirty degrees (that is, fifteen after the front nippers have closed and while the front carriage is near the middle of its outward movement) the pattern-plate has been clamped by the presser-foot, the shifter-pin has disengaged itself, and the yoke which is carried down with the Jacquard cylinder has reached the points of the top wedges. During the next sixty degrees, (one hundred and twenty degrees of shaft U,) half of which period has been occupied by the front carriage in reaching its outward position and half in resting there, the jacquard has reached the bottom of its movement and the yoke has returned the cross-slides and shifter-pin to the central position. The front take-ups also, which have remained up until the front carriage arrived out, have in the thirty degrees succeeding descended, drawn the slack through the fabric, and tightened the stitch. The shaft Q has now made half a revolution and the shaft U a full one. The shifter-pin, Jacquard cylinder, presser-foot, and cross-slides, which are actuated by the shaft U, occupy precisely the positions they did when the embroidering-machine proper occupied the position of Figs. 5, 6, and 7, while the front carriage, front take-ups, and front thread-bars occupy positions corresponding to those of the back carriage, back take-ups, and back thread-bars in Figs. 5, 6, and 7. During the next half-revolution of shaft Q the front take-ups rise, (thirty degrees,) the shifter-pin engages the hole in the pattern-plate and the presser-foot rises, (same thirty degrees,) the Jacquard cylinder rises to the points of the wedges, (same thirty degrees,) the front carriage moves in, (sixty degrees succeeding,) the Jacquard cylinder is lifted to the top of its course, (same sixty degrees, or rather fifty degrees out of the sixty degrees, in order that the fabric may be shifted before the needles puncture it,) the tension-weights as well as the cloth-frame are shifted by the rise of the Jacquard cylinder, the nippers change, (fifteen degrees succeeding the sixty degrees,) the Jacquard cylinder descends until the yoke reaches the points of the top wedges, (thirty degrees succeeding the sixty degrees and including the fifteen degrees for nipper-change,) the presser-foot clamps the pattern-plate and the shifter-pin is disengaged, (same thirty degrees,) the back carriage moves out, (forty-five degrees after the nipper-change is completed,) the Jacquard cylinder descends and returns the cross-slides and shifter-pin to the central position, (sixty degrees after the last-named thirty degrees, or seventy-five degrees after the nipper-change is completed,) the back take-ups descend, (thirty degrees after the back carriage arrives out,) and one revolution of shaft Q is finished. It will be understood that the presser-foot always clamps the pattern-plate during the engagement and disengagement of the shifter-pin, as shown by the relative positions of the cams in Fig. 11, in order that the pattern-plate may never be left free to move of itself if not perfectly balanced. It will be understood, also, that the tension-weights are not shifted at every stitch, but only when the pattern requires a change.

Whenever in making the pattern a stage is reached where it is necessary to punch holes by hand, as explained with reference to Figs. 22 and 23, or where, for other reasons connected with the pattern, it is desirable to suspend the work, an imperforate card on the Jacquard cylinder raises the rod 176 and lever 175, releasing the shipper-bar and shifting the driving-belt to the loose pulley. When the threads get too short, the belt is also shifted automatically, as sufficiently explained before.

In order to prepare the pattern-plate and cards for the Jacquard cylinder, the following mode of procedure is recommended: A pattern is made on paper in the usual way. This paper 460, Figs. 2, 9, and 11, is fastened to the standard 90, so that the pointer 350, fixed to the end of the pantograph-arm 401, can move over the face thereof. The operator then works one or more figures by hand, shifting the cloth-frame by moving the pointer 350 to the different points on the pattern-card successively, as customary in hand-machines. The object of this is to see that the pattern is properly drawn on the card. The faults, when found, are corrected, as customary. When the pattern-card has been corrected, the pointer 350 is brought to the starting-point. The cross-slides are returned to the central position by dropping the Jacquard cylinder and yoke. The shifter-pin is then removed from its holder, a drill is introduced through said holder, and the first hole in said pattern-plate is bored. The drill is now removed and the shifter-pin, or a pin of the same size, is slipped into the holder. The operator before the pattern-card 460 then moves the pointer 350 one step and places it upon the pattern where the next needle-puncture is to be. The pattern-plate R, as well as the cloth-frame, of course follows the movement of the pointer, and, as the shifter-pin or its substitute projects into the pattern-plate and connects it with the cross-slides, said cross-slides and the slides 117 and 118, which carry the wedges, are moved also. The bottom wedges, which, in order that they may be removable, are bolted to the slides, as shown in Figs. 14 and 15, instead of being made integral therewith, as represented for convenience in other figures, have been removed and replaced by markers 351. (Shown in Fig. 16.) These markers consist or may consist of a plate having at the ends two depending projections 352, with chisel-points. The distance between the chisel-points is equal to the length of the slots in the Jacquard. After the slides have been moved the Jacquard cylinder on which a blank card has been placed is raised until the card comes into contact with the chisel-points and is indented by them. The indentations mark the position of the two slots. The blank-card has, of course, a hole in the middle to fit over the projections in the shoes 136. After the card is marked the Jacquard cylinder is lowered, the marked card removed, and the two slots punched, and the card is replaced on top of the cylinder. The markers are now removed from the slides, the wedges 111 and 113 are replaced, the pointer 350 is moved back a step, which again brings the hole in the pattern-plate central, and the shaft U is turned. As the shaft revolves the pin enters the hole in the pattern-plate, the Jacquard cylinder is lifted, the wedges 111 and 113 enter the newly-cut slots in the card, and the cross-slides, shifter-pin, pattern-plate, pointer, and cloth-frame are all moved by the action of the card on the wedges. If the operations have been properly performed, the pointer should be moved exactly to the position it before occupied when moved by hand. If it does not, the source of error should be traced and the proper correction made. If the machine is in proper order, the error will be in the card and may be corrected by altering the card, or, if this be not practical, making a new one. If the pattern-plate be moved too far, it will only be necessary to cut that end of the slot which is nearest the middle of the card, so as to elongate the slot until the motion is reduced to the desired extent. If, however, the pattern-plate be not moved far enough, it would be more difficult to alter the card. It may, therefore, be well, unless the punching is very accurately performed, to move the pointer in marking a very short distance both in a vertical and horizontal direction beyond the proper point on the pattern-card, so that the operative end of the slot, which is always that nearest the center, may, by cutting out, be adjusted to move the wedges and slides the proper distance. After the operation of the slotted card upon the wedges is satisfactory the shifter-pin or its substitute is moved back to the central position, the operator in front of the pattern-card holding the pointer stationary. The shifter-pin is then removed, the drill is inserted in its place, and the second hole is bored. The shifter-pin is now inserted in the second hole and the pointer is moved to the third place on the pattern-card. The markers having been placed on the slides and a blank card on the Jacquard cylinder, the latter is lifted to mark the slots. The cylinder is then lowered, moving the cross-slides and shifter-pin to the central position. The card is taken off the cylinder, has the slot punched therein, and is then replaced. The wedge having been replaced on the slides 117 and 118, the pattern-plate is moved back one step, so that the second hole in the pattern-plate is in the central position. Upon turning the shaft U the shifter-pin will enter this hole, the Jacquard cylinder will lift the newly-punched card, and the wedges, while being acted upon by the cards, move the shifter-pin and pattern-plate in the required direction. If the operation is satisfactory, the pattern-plate is held stationary, the cross-slides are returned to the central position, the shifter-pin is removed, and the third hole bored. The third card is then marked, punched, and tested. The same operations are then performed for the other holes and cards until the whole is complete. Two or more of the cards may of course be connected and tested together as often as desired, the pointer 350 being restored to the starting-point. If the work is accurate, the shifter-pin will sucessively enter each hole and the cloth-frame be properly moved at each step, as can be seen by watching the movement of the pointer over the pattern card 460.

In the foregoing description it has been supposed that the wedge 121 is removed from the slide 120 in order not to be in the way. The slots for this wedge may be marked in the following manner: The operator ascertains by experiment or calculation the position of the tension-weights for each stitch. Then, placing a marker on the slide and adjusting the weights on the take-up levers, the points of the marker will indent the card on the Jacquard cylinder when it is raised. The slot can then be punched. The marking of the slots for adjusting the tension-weights can be effected at the same time with the marking of the other slots or before or subsequently. During the marking and testing operations the shaft Q of the embroidering-machine proper should be disconnected by disengaging the gear 151, as shown, and the shaft U be turned by hand. For this purpose a crank may be applied to the end of the shaft of pulley 160.

Nothing has been said heretofore of the means for disposing of the chain of cards that hang from the cylinder, since the ordinary means may be used for the purpose. In the drawings an inclined track 425, which is one of the ordinary means for supporting the chain, is shown. At intervals in the chain there are cross-rods which project beyond the cards, and when not upheld by the cylinder the ends of these rods rest upon the track and travel down it, so as to be out of the way of the cards, which are continually delivered from the front of the cylinder after they have acted upon the wedges.

Having now fully described our said invention and the manner in which the principle thereof may be applied, we would observe that we do not limit ourselves to the details hereinbefore given, since it is evident that these may be varied within wide limits while employing substantially the same principle; nor do we limit ourselves to the use of all the improvements in combination, although it is designed thus to use them, and the combination itself forms a special feature of invention, since it is evident that one or more improvements or parts of the invention might be used separately. We would also observe that we do not claim herein the subject-matter of our divisional and concurrent application before mentioned; but with this exception

We do claim, and desire to secure by Letters Patent, the new improvements herein described, all and several, as well as the various combinations and sub-combinations of the same, to wit:

1. In combination with the cloth-frame, the series of needles, the needle holders or nippers, and the carriage, the take-up adapted to act upon the threads between the needles and the fabric and provided with means—such as an adjustable weight—for varying the tension exerted by said take-up, substantially as described.

2 The combination, with the cloth-frame, the series of needles, the needle holders or nippers, the carriage, and the take-up, of thread-bars or thread-supports for upholding the thread on either side of the take-up between the needles and the fabric, substantially as described.

3. The combination, with the needles, the needle holders or nippers, and the carriage, of the mechanism—such as cams and connections—for moving the said carriage in and out, the take-up suspended from above and arranged to act upon the threads between the needles and the fabric, and the mechanism—such as cams and connections—for acting directly upon the said take-up independently of the suspending devices, substantially as described.

4. The combination, with the needles, the take-up, and the thread bars or supports, of the cams and connections for operating the same, substantially as described.

5. In an embroidering-machine, the needles and a take-up for acting upon the series of needle-threads, in combination with the connected levers from which said take-up is suspended, substantially as described.

6. The combination, with the cloth-frame, needles, nippers or needle-holders, carriages, take-ups, and thread bars or supports for sustaining the thread when drawn upon by the take-ups, of the cams and connections for operating said parts, carriages, take-ups, and thread-bars, substantially as described.

7. A counterbalanced take-up having the weights or masses on the two sides of the balance unequal and the preponderance on the side for moving the take-up in the direction to draw upon the threads, and comprising a weight adjustable to regulate this preponderance, in combination with the cloth-frame, needles, needle-holders, needle-carriage, and means for returning the take-up against the action of the preponderating weight and for permitting the latter to move it and thereby take up the threads, substantially as described.

8. The combination, with the cloth-frame, the needles, the nippers or needle-holders, the carriages, and the take-ups, of the counterbalance-levers connected with said take-ups and the adjustable tension-weights, substantially as described.

9. The combination, with the needles, the take-up, the counterbalance-levers, and the adjustable tension-weights, of mechanism—such as cams and connections—for operating said take-up and permitting it to act upon the threads by gravity, substantially as described.

10. The combination, with the suspended and movable cloth-frame and the pantograph or system of levers for transmitting motion in all directions and reducing the same in transmission, of Jacquard apparatus for shifting said cloth-frame through said pantograph, substantially as described.

11. The combination, with the cloth-frame and the pattern-plate connected with said cloth-frame so as to move with it, of the shifter-pin and cross-slides, substantially as described.

12. In an embroidering-machine, the combination, with the cloth-frame and pattern-plate connected therewith, of the shifter-pin or device for engaging the said plate and the cross-slides or universal support for permitting the shifter-pin to be moved in all directions, substantially as described, whereby the said cloth-frame may be shifted progressively by back-and-forth movements of said shifter-pin, the latter being disengaged from the pattern-plate in one set of movements, as set forth.

13. In an embroidering-machine having a pantograph connected with the cloth-frame for shifting the same, the pattern-plate attached to the pantograph-arm, substantially as described.

14. The combination, with the cloth-frame, pantograph, and pattern-plate provided with a series of holes arranged according to the pattern, of the shifter-pin and cross-slides, substantially as described.

15. The combination of the cloth-frame, pantograph, pattern-plate, shifter-pin, cross-slides, and jacquard, substantially as described.

16. The combination, with the cloth-frame and the pattern-plate connected therewith, of the shifter-pin, the cross-slides, the wedges connected with said slides, respectively, the Jacquard cylinder, and the slotted cards, substantially as described.

17. The combination, with the embroidering-machine proper and the mechanism for operating the same, including the Jacquard apparatus and the driving-gear, of the stop mechanism or belt shipper and connections, comprising a rod arranged to be acted upon by the jacquard to stop the machine whenever a properly-prepared card is brought into action, substantially as described.

18. The combination, with the variable take-up of the embroidering-machine, of a lever constructed and arranged to be acted upon by said take-up and stop mechanism controlled by said lever, so that when the movement of the take-up, owing to the shortness of the threads, becomes insufficient to give the full movement to said lever said stop mechanism is operated to bring the machine to rest, substantially as described.

19. The belt-shipper, the spring for moving the same, and the trip-pawl, in combination with the take-up of the embroidering-machine, a lever actuated thereby, a second lever connected with said trip-pawl, a spring tending to withdraw said pawl, and the lever for returning the take-up after it has acted upon the threads, said parts being combined and arranged as described, so that the said last-named spring is prevented from acting until the embroidering-threads are substantially used up, as set forth.

20. The combination, with the embroidering-machine proper and the jacquard, of the stop mechanism, the rod and connections for bringing the same into action from the jacquard, and the lever actuated from the take-up and connections for bringing it into action from the embroidering-machine, substantially as described.

21. The combination, with the tension-weights, of the take-ups and the jacquard for moving the same, substantially as described.

22. The combination of the take-up, counterbalance-levers, sliding tension-weight, wedge connected therewith, Jacquard cylinder, and slotted card for shifting said weight, substantially as described.

23. The combination, with the cloth-frame and stitch-forming mechanism of the embroidering-machine, including the adjustable tension devices, of the jacquard for shifting the cloth-frame and for adjusting the tension and the cams and connections for operating the switch-forming devices other than the adjustable tension, substantially as described.

24. The combination, with the tension apparatus of an automatic embroidering-machine, of a revolving shaft connected with the main shaft of such machine and mechanism between said shaft and said tension apparatus for varying the same mechanically, so as to regulate automatically the degree of tightness with which the stitches are drawn, substantially as described.

25. The herein-described automatic embroidering-machine, consisting of the embroidering-machine proper, combined with the Jacquard apparatus and the operating mechanism, said embroidering-machine proper comprising the cloth-frame, nipper-carriages, nippers, needles, take-ups, and thread bars or supports, said Jacquard apparatus comprising the pattern-plate, shifter-pin, cross-slides, wedges, Jacquard cylinder, yoke, cards, and wedges, and said operating mechanism comprising the shafts, cams, levers, and connections, substantially as described.

In testimony whereof we have signed this specification in the presence of two subscribing witnesses.

CHAS. H. WILLCOX.
R. WEISS.

Witnesses:
ARTHUR T. CLARKE,
J. H. COOKE.